(12) United States Patent
Lin

(10) Patent No.: US 8,180,171 B2
(45) Date of Patent: May 15, 2012

(54) NOISE CANCELLATION DEVICE FOR AN IMAGE SIGNAL PROCESSING SYSTEM

(75) Inventor: Teng-Yi Lin, Kaohsiung County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1249 days.

(21) Appl. No.: 11/849,297

(22) Filed: Sep. 2, 2007

(65) Prior Publication Data

US 2008/0309680 A1    Dec. 18, 2008

(30) Foreign Application Priority Data

Jun. 13, 2007    (TW) .............................. 96121405 A

(51) Int. Cl.
*G06K 9/40*    (2006.01)
(52) U.S. Cl. .................... 382/264; 382/260; 382/275
(58) Field of Classification Search .................. 382/260, 382/238, 274, 75, 305, 264; 370/389, 466, 370/474; 348/229, 241, 245, 297; 710/1
See application file for complete search history.

(56) References Cited

U.S. PATENT DOCUMENTS

| | | | | |
|---|---|---|---|---|
| 4,672,445 A * | 6/1987 | Casey et al. | ............. | 348/450 |
| 5,218,449 A * | 6/1993 | Ko et al. | ............. | 386/202 |
| 5,225,898 A * | 7/1993 | Imai et al. | ............. | 348/624 |
| 5,412,481 A * | 5/1995 | Ko et al. | ............. | 386/273 |
| 5,543,858 A * | 8/1996 | Wischermann | ............. | 348/618 |
| 5,818,972 A * | 10/1998 | Girod et al. | ............. | 382/260 |
| 5,841,251 A * | 11/1998 | Vroemen et al. | ............. | 348/181 |
| 5,845,039 A * | 12/1998 | Ko et al. | ............. | 386/275 |
| 5,925,875 A * | 7/1999 | Frey | ............. | 250/208.1 |
| 6,118,489 A * | 9/2000 | Han et al. | ............. | 348/452 |
| 6,259,489 B1 * | 7/2001 | Flannaghan et al. | ............. | 348/620 |
| 6,311,555 B1 * | 11/2001 | McCall et al. | ............. | 73/488 |
| 6,360,014 B1 * | 3/2002 | Boon | ............. | 382/233 |
| 6,400,762 B2 * | 6/2002 | Takeshima | ............. | 375/240.01 |
| 6,567,468 B1 * | 5/2003 | Kato et al. | ............. | 375/240.12 |
| 6,597,738 B1 * | 7/2003 | Park et al. | ............. | 375/240.16 |
| 6,654,054 B1 * | 11/2003 | Embler | ............. | 348/241 |
| 6,687,300 B1 * | 2/2004 | Fujita et al. | ............. | 375/240.16 |
| 7,003,037 B1 * | 2/2006 | Bordes et al. | ............. | 375/240.16 |
| 7,034,870 B2 * | 4/2006 | Nagaoka et al. | ............. | 348/228.1 |

(Continued)

OTHER PUBLICATIONS

Liu et al. "A Block Based Gradient Descent Search Algorithm for Block Motion Estimation in Video Coding" IEEE Transactions on Circuits and Systems for Video Technology, Vo. 6, No. 4, Aug. 1996, pp. 419-422 (pp. 1-4).*

(Continued)

*Primary Examiner* — Jason M Repko
*Assistant Examiner* — Mia M Thomas
(74) *Attorney, Agent, or Firm* — Winston Hsu; Scott Margo

(57) ABSTRACT

A noise cancellation device for an image signal processing system includes a receiving end for receiving image signals, a 3D filtering unit for adjusting a filtering parameter according to a motion estimation value, and filtering the image signals and a former filtering result for generating a current filtering result, a motion detection unit for comparing the former filtering result and the image signals, so as to generate a current motion factor and the motion estimation value according to a former motion factor, a memory unit for receiving and storing the current filter result and the current motion factor as the former filtering result and the former motion factor, and an output end for outputting the current filtering result provided by the 3D filtering unit.

19 Claims, 5 Drawing Sheets

U.S. PATENT DOCUMENTS

| | | | |
|---|---|---|---|
| 7,061,548 B2* | 6/2006 | Piepers | 348/624 |
| 7,085,318 B2* | 8/2006 | Kondo et al. | 375/240.01 |
| 7,170,562 B2* | 1/2007 | Yoo et al. | 348/452 |
| 7,193,655 B2* | 3/2007 | Nicolas | 348/448 |
| 7,268,835 B2* | 9/2007 | Babonneau et al. | 348/607 |
| 7,365,801 B2* | 4/2008 | Kondo | 348/620 |
| 7,460,697 B2* | 12/2008 | Erhart et al. | 382/124 |
| 7,489,829 B2* | 2/2009 | Sorek et al. | 382/260 |
| 7,567,300 B2* | 7/2009 | Satou et al. | 348/609 |
| 7,570,833 B2* | 8/2009 | Lee | 382/260 |
| 7,769,089 B1* | 8/2010 | Chou | 375/240.29 |
| 7,887,489 B2* | 2/2011 | Lee et al. | 600/484 |
| 2001/0012408 A1* | 8/2001 | Badyal et al. | 382/263 |
| 2001/0035916 A1* | 11/2001 | Stessen et al. | 348/607 |
| 2001/0050956 A1* | 12/2001 | Takeshima | 375/240.16 |
| 2002/0044205 A1* | 4/2002 | Nagaoka et al. | 348/229 |
| 2003/0071920 A1* | 4/2003 | Yu | 348/622 |
| 2003/0122967 A1* | 7/2003 | Kondo et al. | 348/607 |
| 2003/0123750 A1* | 7/2003 | Yu | 382/275 |
| 2003/0189655 A1* | 10/2003 | Lim et al. | 348/241 |
| 2004/0153581 A1* | 8/2004 | Nakaya et al. | 710/1 |
| 2004/0179108 A1* | 9/2004 | Sorek et al. | 348/216.1 |
| 2004/0233326 A1* | 11/2004 | Yoo et al. | 348/452 |
| 2004/0257467 A1* | 12/2004 | Nicolas | 348/452 |
| 2004/0264802 A1* | 12/2004 | Kondo | 382/275 |
| 2005/0083439 A1* | 4/2005 | Endress et al. | 348/702 |
| 2005/0084011 A1* | 4/2005 | Song et al. | 375/240.12 |
| 2005/0094035 A1* | 5/2005 | Babonneau et al. | 348/607 |
| 2005/0135427 A1* | 6/2005 | Machimura et al. | 370/474 |
| 2005/0162566 A1* | 7/2005 | Chuang et al. | 348/714 |
| 2005/0243194 A1* | 11/2005 | Xu | 348/241 |
| 2005/0286802 A1* | 12/2005 | Clark et al. | 382/286 |
| 2006/0038920 A1* | 2/2006 | Kondo et al. | 348/561 |
| 2006/0050146 A1* | 3/2006 | Richardson | 348/80 |
| 2006/0104353 A1* | 5/2006 | Johnson et al. | 375/240.03 |
| 2006/0187357 A1* | 8/2006 | Satou et al. | 348/631 |
| 2007/0047647 A1* | 3/2007 | Lee et al. | 375/240.12 |
| 2007/0182862 A1* | 8/2007 | Li et al. | 348/701 |
| 2007/0229709 A1* | 10/2007 | Asamura et al. | 348/607 |
| 2008/0074552 A1* | 3/2008 | Jung et al. | 348/663 |
| 2008/0218630 A1* | 9/2008 | Kempf et al. | 348/452 |
| 2008/0232708 A1* | 9/2008 | Erdler et al. | 382/255 |
| 2008/0278631 A1* | 11/2008 | Fukuda | 348/607 |
| 2008/0291298 A1* | 11/2008 | Kim et al. | 348/241 |
| 2009/0086814 A1* | 4/2009 | Leontaris et al. | 375/240.02 |
| 2009/0184894 A1* | 7/2009 | Sato et al. | 345/60 |
| 2009/0245639 A1* | 10/2009 | Erdler et al. | 382/173 |
| 2010/0165207 A1* | 7/2010 | Deng et al. | 348/620 |

OTHER PUBLICATIONS

Turaga et al. "Estimation and Mode Decision for Spatially Correlated Motion Sequences" IEEE Transactions on Circuits and Systems for Video Technology Vo. 11, No. 10, Oct. 2001, pp. 1-10 (1098-1107).*

Chen et al. "Image Noise Cancellation by Adaptive Filter with Weight Training Mechanism (AFWTM)" 2007 Information, Decision, and Control pp. 1-4.*

Lee et al. "Segmentation Based Adaptie Spatio-Temporal Filtering for Noise Canceling and MPEG Pre-Processing" 2005 (IEEE) pp. 1-2.*

* cited by examiner

NOISE CANCELLATION DEVICE FOR AN IMAGE SIGNAL PROCESSING SYSTEM

BACKGROUND OF THE INVENTION

1. Field of the Invention

The present invention is related to a noise cancellation device for an image signal processing system, and more particularly, to a noise cancellation device capable of performing filtering operations for image signals according to a motion degree of images, so as to reduce noise, improve image quality, and maintain definition of the images.

2. Description of the Prior Art

With rapid developments of communication and computer techniques, image applications have more and more variety. Briefly, each of the image applications can be regarded as a combination of an image data source and a player. The image data source can be any device capable of outputting image signals, such as a computer, a DVD player, a cable or wireless television signal LS (Launch-Station), a video game player, etc., and is utilized for outputting image signals to the player through wired or wireless channels, so as to display images. During signal transmission, signals are inevitably interfered by noise, topography, and surface features. Even in the image data source or the player, signals processed by the image data source or the player may be mingled with unanalyzable elements of noise due to circuit defects or environment conditions (e.g. temperature or humidity), which reduces image quality.

SUMMARY OF THE INVENTION

It is therefore a primary objective of the claimed invention to provide a noise cancellation device for an image signal processing system.

The present invention discloses a noise cancellation device for an image signal processing system, which comprises a receiving end for receiving an image signal, a 3D (three-dimensional) filtering unit for adjusting a filtering parameter according to a motion estimation value, and filtering the image signal and a former filtering result for generating a current filtering result, a motion detection unit for comparing the former filtering result and the image signal received by the receiving end, so as to generate a current motion factor and the motion estimation value according to a former motion factor, a memory unit for receiving and storing the current filtering result outputted from the 3D filtering unit and the current motion factor outputted from the motion detection unit as the former filtering result and the former motion factor, and an output end for outputting the current filtering result provided by the 3D filtering unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
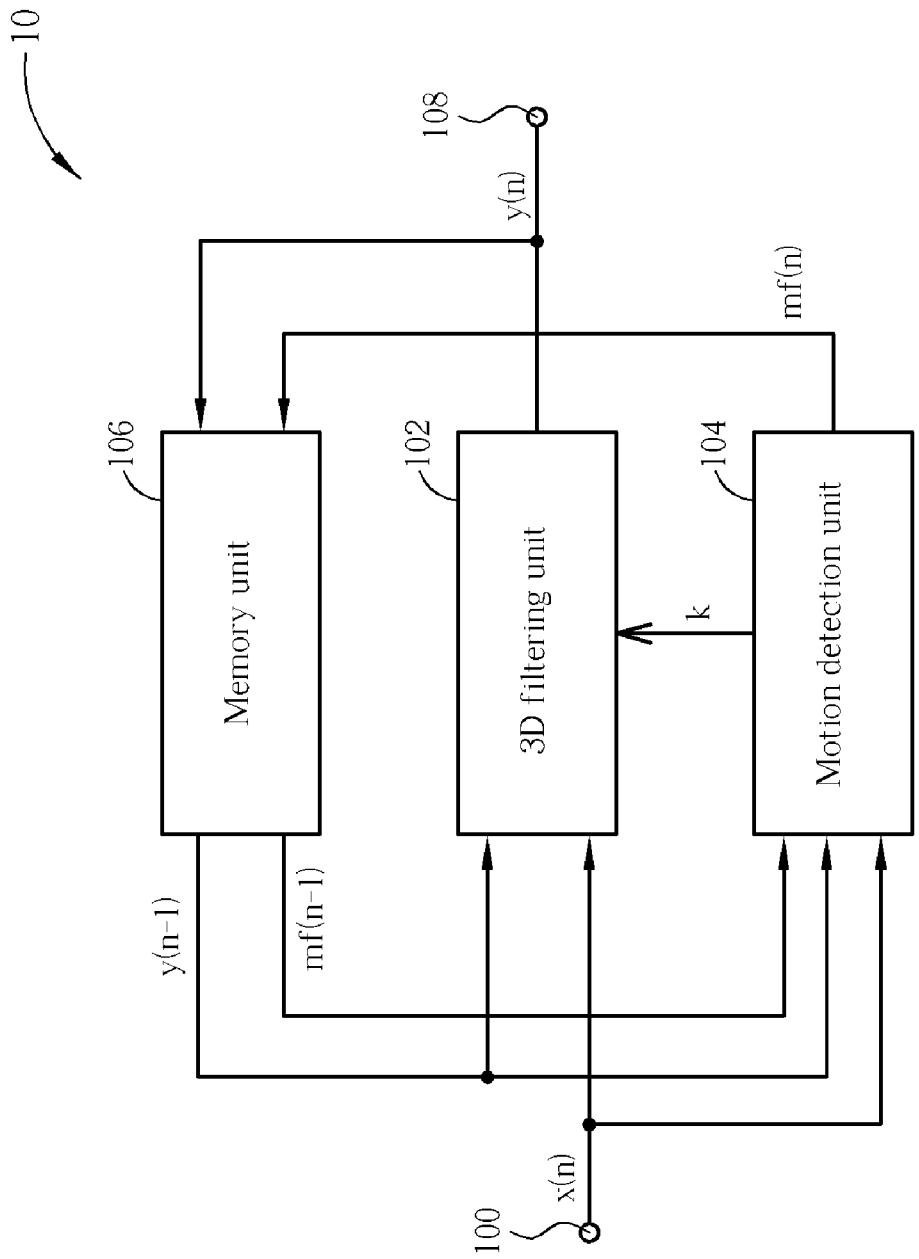
FIG. 1 illustrates a function block diagram of a noise cancellation device according to an embodiment of the present invention.

Please refer to FIG. 1. FIG. 1 illustrates a function block diagram of a noise cancellation device 10 according to an embodiment of the present invention. The noise cancellation device 10 is utilized for reducing 3D noise in an image processing system, and comprises a receiving end 100, a 3D filtering unit 102, a motion detection unit 104, a memory unit 106, and an output end 108. The noise cancellation device 10 receives an image signal x(n) of a current image through the receiving end 100. Then, the 3D filtering unit 102, the motion detection unit 104, and the memory unit 106 process the image signal x(n), and output a filtering result y(n) through the output end 108. In FIG. 1, y(n) represents a filtering result of a current image, and y(n−1) represents a filtering result of a former image; mf(n) represents a motion factor of the current image, and mf(n−1) represents a motion factor of the former image. Besides, k represents a motion estimation value, which will be narrated in detail later. Besides, the motion factor and the motion estimation value are positively correlated to a motion degree of an image corresponding to the image signal x(n), meaning that the greater the motion degree is, the greater the motion factor mf(n) and the value of k are.

The memory unit 106 stores the filtering result y(n) and the corresponding motion factor mf(n) for a specified duration, and outputs them to the 3D filtering unit 102 and the motion detection unit 104 when the next image comes. The motion detection unit 104 determines the motion degree of the current image, which compares the filtering result y(n−1) with the image signal x(n), and generates the motion factor mf(n) and the motion estimation factor k according to the comparison result and the motion factor mf(n−1) of the former image. According to the motion estimation value k and the filtering result y(n−1), the 3D filtering unit 102 can perform appropriate filtering for the image signal x(n), so as to generate the filtering result y(n). Preferably, the 3D filtering unit 102 performs 2D low-pass filtering operations for the image signal x(n) when images are dynamic, and performs infinite impulse response (IIR) operations for the image signal x(n) when the images are static. In other words, the motion detection unit 104 can determine the motion degree of the images, while the 3D filtering unit 102 performs appropriate filtering for the image signal x(n) according to the motion degree. Therefore, the noise cancellation device 10 can effectively reduce noise, improve image quality, and maintain definition of the static images.

Briefly, the memory unit 106 stores the filtering result and the motion factor of the former image, while the 3D filtering unit 102 and the motion detection unit 104 determine the motion degree according to the filtering result and the motion factor stored in the memory unit 106, so as to perform appropriate filtering for the image signal x(n) to generate the filtering result and the motion factor of the current image. In this situation, the noise cancellation device 10 can perform appropriate filtering operations for the image signal x(n) according to the motion degree, which can effectively reduce noise, improve image quality, and maintain definition of the static images. Note that, FIG. 1 is merely a function block diagram of the noise cancellation device 10. Circuits and devices, which can realize the 3D filtering unit 102, the motion detection unit 104, and the memory unit 106, are suitable for the present invention. Also, the numbers, types, and styles of signal lines between different elements of the embodiment shown in FIG. 1 are not limited.

Figure 2:
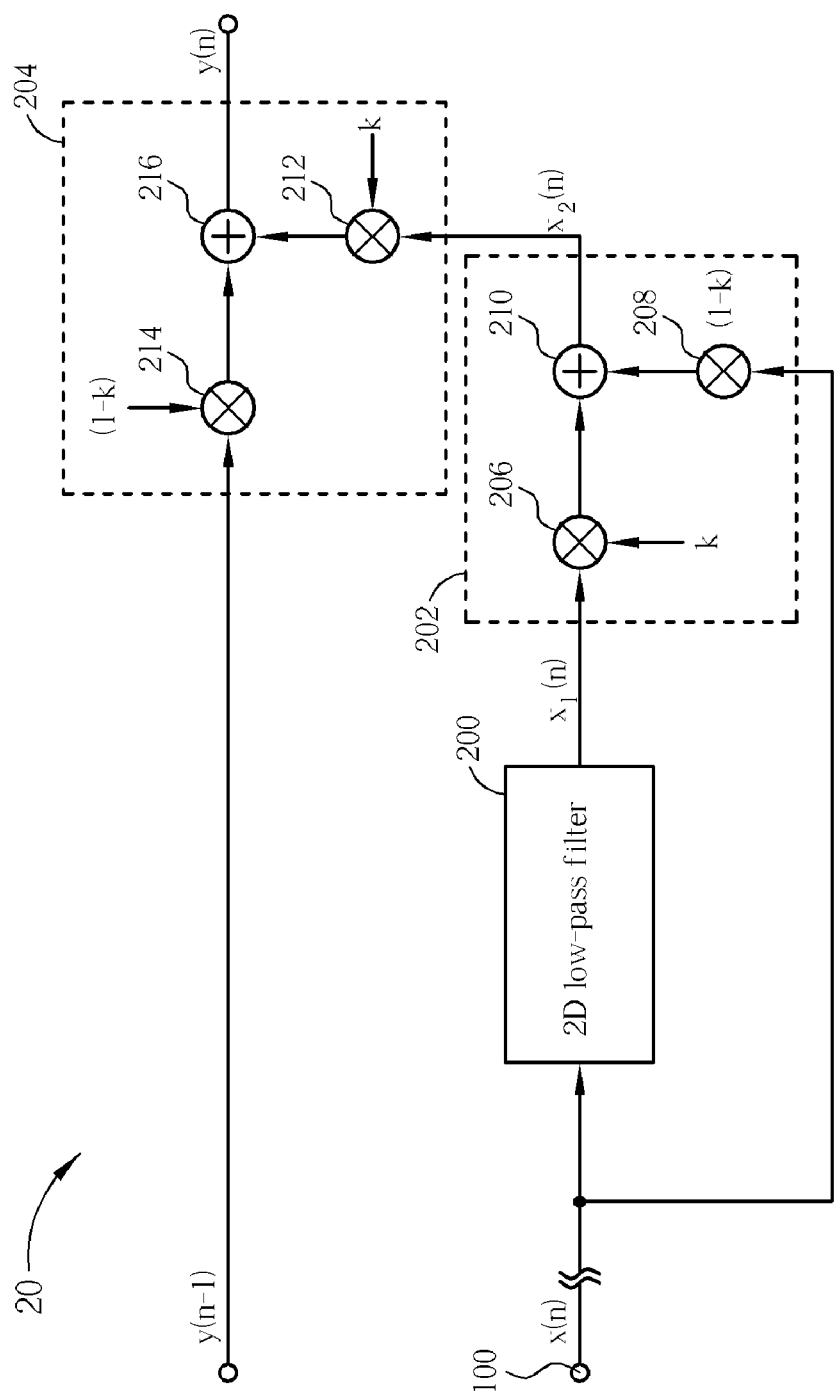
FIG. 2 illustrates a schematic diagram of a 3D filtering unit.

For example, please refer to FIG. 2. FIG. 2 illustrates a schematic diagram of a 3D filtering unit 20. The 3D filtering unit 20 is utilized for realizing the 3D filtering unit 102 shown in FIG. 1, and comprises a 2D low-pass filter 200, a first signal mixer 202, and a second signal mixer 204. The 2D low-pass filter 200 is coupled to the receiving end 100, and performs 2D low-pass filtering for the image signal x(n) for outputting a 2D low-pass filtering result $x_1(n)$. The first signal mixer 202 is composed of multipliers 206, 208, and an adder 210, and is utilized for adjusting weightings of the 2D low-pass filtering result $x_1(n)$ and the image signal x(n) according to the motion estimation value k, so as to generate a mixed signal $x_2(n)$. The relation is $x_2(n)=k*x_1(n)+(1-k)*x(n)$. The second signal mixer 204 is composed of multipliers 212, 214, and an adder 216, and is utilized for adjusting weightings of the former filtering result y(n−1) and the mixed signal $x_2(n)$ according to the motion estimation value k, so as to generate the current filtering result y(n). The relation is $y(n)=k*x_2(n)+(1-k)*y(n-1)$. Therefore, when the images are dynamic, the value of k is greater, y(n) is close to $x_2(n)$, and $x_2(n)$ is close to $x_1(n)$, which means that the filtering result y(n) is close to the 2D low-pass filtering result $x_1(n)$ of the 2D low-pass filter 200. On the contrary, when the images are static, the value of k is smaller, and y(n) is close to (k*x(n)+(1−k) y(n−1)), which means that the filtering result y(n) is a combination of the image signal x(n) and the former filtering result y(n−1), and can be regarded as an IIR filtering result.

Therefore, according to the motion degree of the images, the 3D filtering unit 20 adjusts filtering operations for enhancing the quality of dynamic images and maintaining original definition of static images.

Figure 3:
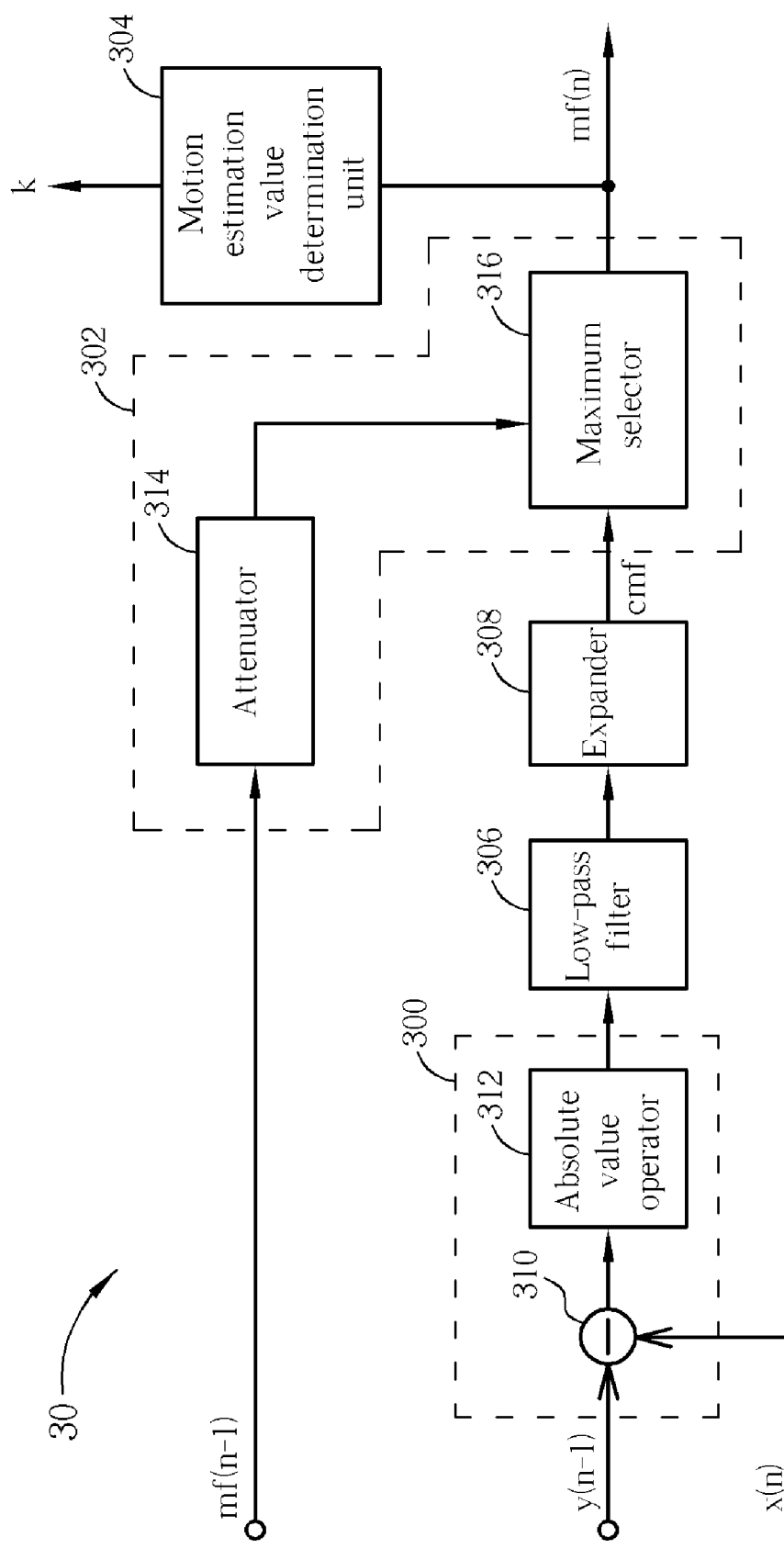
FIG. 3 illustrates a schematic diagram of a motion detection unit.

Please refer to FIG. 3. FIG. 3 illustrates a schematic diagram of a motion estimation unit 30. The motion estimation unit 30 is utilized for realizing the motion detection unit 104, comprises a comparison unit 300, a computation unit 302, and an motion estimation value determination unit 304, a low-pass filter 306, and an expander 308. The comparison unit 300 compares the image signal x(n) and the former filtering result y(n−1), and is composed of a subtractor 310 and an absolute value operator 312. The comparison results outputted by the comparison unit 300 are filtered out by the low-pass filter 306 for discarding high frequency parts and making image smoother, and are expanded through the expander 308 to output a signal cmf to the computation unit 302. Note that, the low-pass filter 306 and the expander 308 strengthen the accuracy of the motion factor mf(n) and the motion estimation value k outputted from the motion estimation unit 30, and can be omitted. The computation unit 302 performs a computation equation for the signal cmf and the former motion factor mf(n−1), so as to output the current motion factor mf(n). In this case, the computation unit 302 is composed of an attenuator 314 and a maximum selector 316, and the corresponding computation equation is mf(n)=max (a*mf(n−1), cmf), where "a" represents an attenuation factor of the attenuator 314. The motion estimation value determination unit 304 outputs the motion estimation value k by a specific rule according to the current motion factor mf(n).

Figure 4:
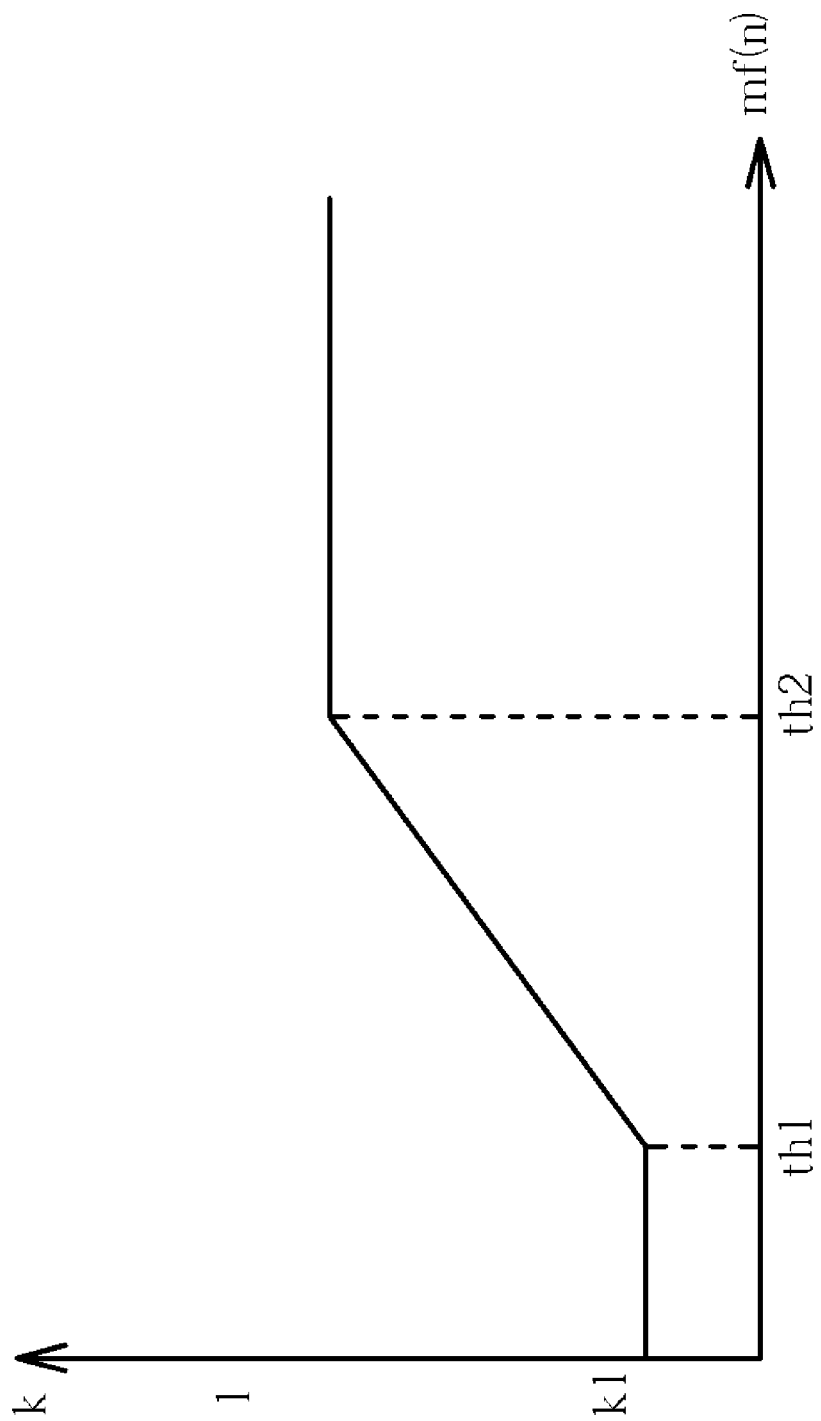
FIG. 4 illustrates a schematic diagram of an estimation value determination unit.

Note that, the motion estimation unit 30 shown in FIG. 3 is merely an embodiment of the motion detection unit 104 shown in FIG. 1, and those skilled in the art can make proper alternation. For example, the motion estimation value determination unit 304 can be realized by a look-up table shown in FIG. 4. When the motion factor mf(n) is greater than a threshold value th2, the motion estimation value k is 1. When the motion factor mf(n) is smaller than a threshold value th1, the motion estimation value k is k1. When the motion factor mf(n) is between the threshold value th1 and the threshold value th2, the motion estimation value k is a linear interpolation result of 1 and k1.

Figure 5:
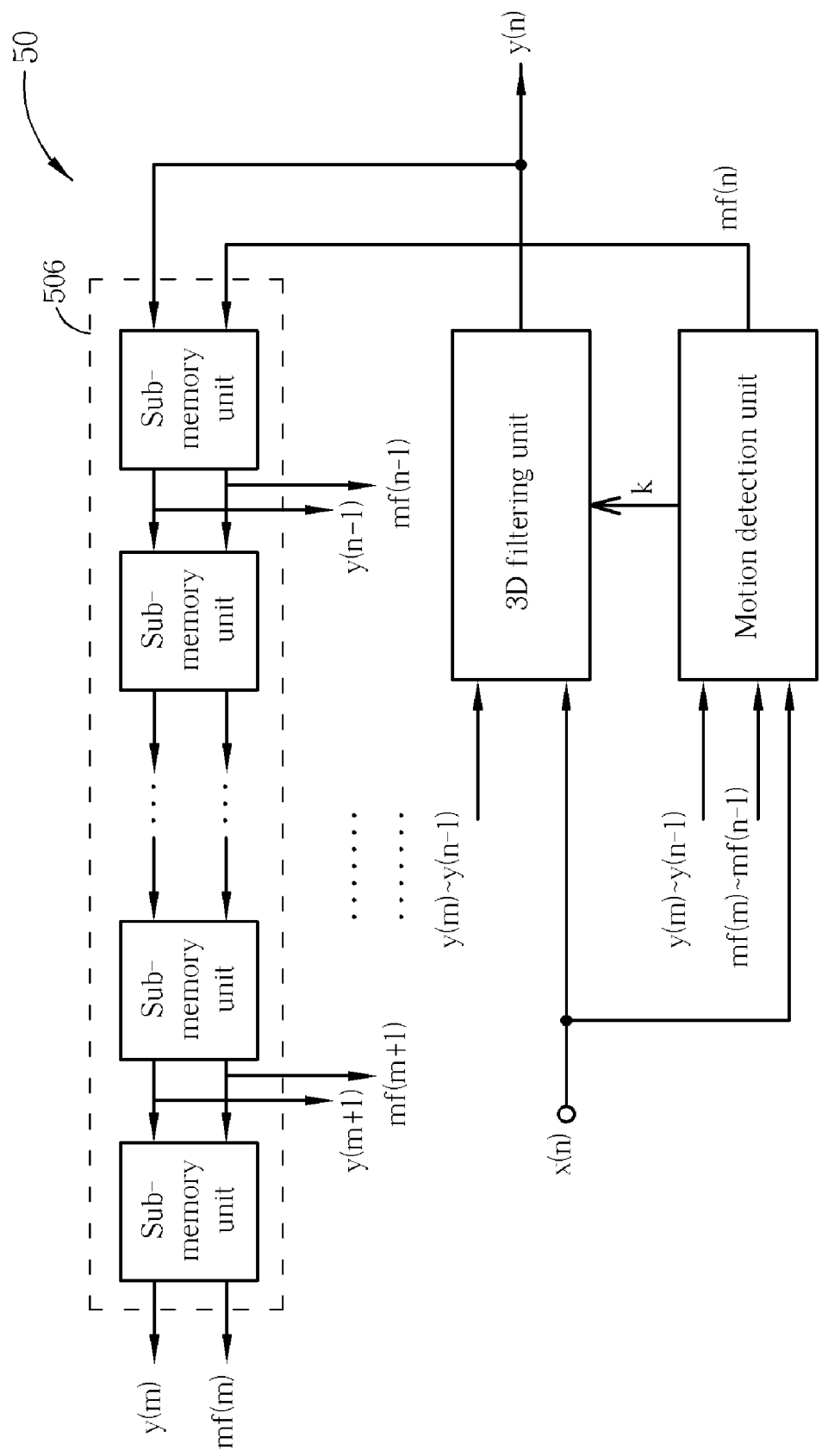
FIG. 5 illustrates a function block diagram of a noise cancellation device according to an embodiment of the present invention.

In the preferred embodiment of the present invention, the noise cancellation device 10 generates the filtering result and the motion factor of the current image according to the filtering result and the motion factor of the former image. In such a situation, the memory unit 106 stores a filtering result and a motion factor of an image. Certainly, the present invention can also generate the filtering result and the motion factor of the current image according to filtering results and motion factors of a plurality of former images. For example, please refer to FIG. 5. FIG. 5 illustrates a function block diagram of a noise cancellation device 50 according to an embodiment of the present invention. The noise cancellation device 50 generates a filtering result and a motion factor of a current image according to filtering results and motion factors of a plurality of former images. The operation method and structure are similar to those of the noise cancellation device 10 shown in FIG. 1, which will not be narrated in detail. In FIG. 5, a memory unit 506 of the noise cancellation device 50 is composed of a plurality of sub-memory units. Each sub memory unit can store a filtering result and a motion factor of an image. Therefore, the noise cancellation device 50 can generate the filtering result y(n) and the motion factor mf(n) of the current image according to filtering results y(m)~y(n−1) and motion factors mf(m)~mf(n−1) of the plurality of former images.

In conclusion, the present invention performs appropriate filtering operations for image signals according to the motion degree of the images, which can effectively reduce noise, improve image quality, and maintain definition of static images.

Those skilled in the art will readily observe that numerous modifications and alterations of the device and method may be made while retaining the teachings of the invention.

What is claimed is:

1. A noise cancellation device for an image signal processing system comprising:
   a receiving end for receiving an image signal;
   a 3D (three-dimensional) filtering unit coupled to the receiving end for adjusting a filtering parameter according to a motion estimation value, and filtering the image signal and a former filtering result for generating a current filtering result;
   an motion detection unit coupled to the receiving end and the 3D filtering unit for comparing the former filtering result and the image signal received by the receiving end, so as to generate a current motion factor and the motion estimation value according to a former motion factor;
   an memory unit coupled to the 3D filtering unit and the motion detection unit for receiving and storing the current filtering result outputted from the 3D filtering unit and the current motion factor outputted from the motion detection unit, and outputting the stored current filtering result and the stored current motion factor to the 3D filtering unit and the motion detection unit as the former filtering result and the former motion factor for a next image signal; and
   an output end coupled to the 3D filtering unit and the memory unit for outputting the current filtering result provided by the 3D filtering unit.

2. The noise cancellation device of claim 1, wherein the 3D filtering unit comprises:

a 2D (two-dimensional) low-pass filter coupled to the receiving end for performing 2D low-pass filtering for the image signal for outputting a 2D low-pass filtering result;

a first mixer coupled to the receiving end and the 2D low-pass filter for adjusting weightings of the 2D low-pass filtering result and the image signal according to the motion estimation value for generating a mixed signal; and a second mixer coupled to the memory unit and the first mixer for adjusting weightings of the former filtering result and the mixed signal according to the motion estimation value for generating the current filtering result.

3. The noise cancellation device of claim 2, wherein the first mixer increases the weighting of the 2D low-pass filtering result as the motion estimation value increases, and decreases the weighting of the 2D low-pass filtering result as the motion estimation value decreases.

4. The noise cancellation device of claim 2, wherein the first mixer comprises:

a first multiplier coupled to the 2D low-pass filter for multiplying the 2D low-pass filtering result by the motion estimation value for generating a first multiplication result;

a second multiplier coupled to the receiving end for multiplying the image signals by a complement of the motion estimation value for generating a second multiplication result; and an adder coupled to the first multiplier and the second multiplier for accumulating the first multiplication result and the second multiplication result for generating the mixed signal.

5. The noise cancellation device of claim 4, wherein the complement of the motion estimation value equals the difference between 1 and the motion estimation value.

6. The noise cancellation device of claim 2, wherein the second mixer increases the weighting of the mixed signal as the motion estimation value increases, and decreases the weighting of the mixed signal as the motion estimation value decreases.

7. The noise cancellation device of claim 2, wherein the second mixer comprises:

a first multiplier coupled to the first mixer for multiplying the mixed signal by the motion estimation value for generating a first multiplication result;

a second multiplier coupled to the memory unit for multiplying the image signal by a complement of the motion estimation value for generating a second multiplication result; and an adder coupled to the first multiplier and the second multiplier for accumulating the first multiplication result and the second multiplication result for generating the current filtering result.

8. The noise cancellation device of claim 7, wherein the complement of the motion estimation value equals the difference between 1 and the motion estimation value.

9. The noise cancellation device of claim 1, wherein the motion detection unit comprises:

a comparison unit coupled to the receiving end and the memory unit for comparing the image signal and the former filtering result stored in the memory unit for outputting a comparison result;

a computation unit coupled to the comparison unit and the memory unit for performing a computation equation for the comparison result outputted from the computation unit according to the former motion factor stored in the memory unit for outputting the current motion factor; and an motion estimation value determination unit coupled to the computation unit for outputting the motion estimation value according the current motion factor.

10. The noise cancellation device of claim 9, wherein the comparison unit comprises:

a subtractor coupled to the receiving end and the memory unit for computing a difference between the image signal and the former filtering result stored in the memory unit for generating a subtraction result; and an absolute value operator coupled between the subtractor and the computation unit for computing an absolute value of the subtraction result for generating the comparison result.

11. The noise cancellation device of claim 9, wherein the computation unit comprises:

an attenuator coupled to the memory unit for attenuating the former filtering result stored in the memory unit for generating an attenuation result; and an maximum selector coupled to the attenuator and the comparison unit for obtaining a maximum of the attenuation result and the comparison result for providing the current motion factor.

12. The noise cancellation device of claim 9, wherein the motion estimation value determination unit is a look-up table.

13. The noise cancellation device of claim 9 further comprising a low-pass filter coupled between the comparison unit and the computation unit for computing a low-pass filtering result of the comparison result.

14. The noise cancellation device of claim 9 further comprising an expander coupled between the comparison unit and the computation unit for expanding a range of the comparison result.

15. The noise cancellation device of claim 1, wherein the memory unit stores a filtering result and a motion factor of an image.

16. The noise cancellation device of claim 1, wherein the memory unit stores filtering results and motion factors of a plurality of images.

17. The noise cancellation device of claim 16, wherein the memory unit comprises:

a signal receiving end for receiving the current filtering result and the current motion factor;

a signal output end for outputting the former filtering result and the former motion factor; and a sub-memory unit sequence coupled between the signal receiving end and the signal output end, comprising a plurality of sub-memory units each utilized for storing a filtering result and a motion factor of an image.

18. The noise cancellation device of claim 1, wherein the motion estimation value is positively correlated to a motion degree of an image corresponding to the image signal.

19. The noise cancellation device of claim 1, wherein the motion factor is positively correlated to a motion degree of an image corresponding to the image signal.

* * * * *